United States Patent [19]

Keyser et al.

[11] Patent Number: 5,341,128
[45] Date of Patent: Aug. 23, 1994

[54] SENSOR ELEMENT FOR DETECTION OF HYDROCARBONS

[75] Inventors: Paul Keyser, West Newbury; George Watchko, Stoneham, both of Mass.

[73] Assignee: Chomerics, Inc., Woburn, Mass.

[21] Appl. No.: 866,725

[22] Filed: Apr. 10, 1992

[51] Int. Cl.⁵ ............................................. G08B 21/00
[52] U.S. Cl. ........................................ 340/605; 340/603;
73/40; 174/11 R
[58] Field of Search ................ 340/603, 604, 605;
200/61.04, 61.05; 73/40, 40.5 R; 174/11 R

[56] References Cited

U.S. PATENT DOCUMENTS

| | | | |
|---|---|---|---|
| 4,926,165 | 5/1990 | Lahlouh et al. | 340/603 |
| 4,972,179 | 11/1990 | Akiba | 340/605 |
| 5,101,657 | 4/1992 | Lahlouh et al. | 340/604 X |
| 5,177,996 | 1/1993 | Sahakian | 340/605 X |

Primary Examiner—Jeffery A. Hofsass
Attorney, Agent, or Firm—John Dana Hubbard; William L. Baker

[57] ABSTRACT

A sensor for detecting the presence of hydrocarbons and hydrocarbon containing fluids. It is formed of a first conductor which is formed of a metal wire or metal foil covered by an insulative sheath; a second conductor which consists of a hydrocarbon swellable elastomer and one or more conductive fillers; optionally an abuse/abrasion resistant jacket overlaying and preferably surrounding the two conductors and optionally a hydrocarbon permeable overcoat overlaying the jacket. The sensor may be in the form of a continuous length wire or a tape or a sheet. It may be coupled to an electric supply at one portion and a resistance indicator at the return portion. The resistance indicator is then attached to a signaling device such as a light or alarm.

14 Claims, 2 Drawing Sheets

SENSOR ELEMENT FOR DETECTION OF HYDROCARBONS

The present invention relates to a detection system for hydrocarbons. More particularly, it relates to a sensor for detecting liquids containing hydrocarbons and a system incorporating such a sensor.

BACKGROUND OF THE INVENTION

Sensors for detecting leaking hydrocarbons, such as gasoline or hydrocarbon based solvents and other products are well known. Such detectors or sensors are generally used on storage tanks gasoline stations or pipelines containing such hydrocarbon products.

The known sensors generally operate on the principle of an open to closed electrical circuit. The principle as follows: a sensor is formed of a pair of conductors which form an open circuit. A change in the electrical status occurs in the presence of a hydrocarbon, causing the circuit to be closed (become electrically connected). The leakage is detected as a result of the detection of the completed circuit.

Variations on this principle are well known. For example, U.S. Pat. No. 4,926,165 contains a swellable material, which when it swells, causes an electrical connection between the two conductors, thus completing the circuit. Likewise, U.S. Pat. No. 4,972,179 uses three conductors to form a wheatstone bridge circuit when the second and third conductors are short circuited by the presence of a liquid.

The complexity of the known devices leads to high cost. Further, most of these detectors are not reusable, thereby increasing their cost and shortening their useful life span. Perhaps the biggest disadvantages with the existing sensors are their sensitivity and their selectivity. Most sensors send false signals in the presence of contaminated ground water (such as ground water containing salts or other non-organic contaminants). Additionally, the sensitivity of the sensors varies widely. Some, such as those which rely upon the swelling of one layer to contact a second layer so as to close a circuit, require an adversely high concentration of hydrocarbons to be present before completing a circuit. These problems make quick, reliable and repeatable detection of leaks difficult, if not impossible.

The present invention overcomes the problems encountered in the known systems. The object of the present invention is to provide a sensor for detecting the presence of hydrocarbons without the generation of false signals, or the need for high concentrations of hydrocarbons and with the ability to provide repetitive, reliable detection.

SUMMARY AND OBJECTS OF THE INVENTION

The present invention is a sensor for detecting the presence of hydrocarbons and hydrocarbon containing fluids. It is formed of a first conductor which is formed of a metal such as wire or foil surrounded by an insulative layer; a second conductor which consists of a hydrocarbon swellable elastomer and one or more conductive fillers; optionally an abuse/abrasion resistant fabric overlaying the second conductor and a hydrocarbon permeable overcoat surrounding and interpenetrating the fabric.

An object of the present invention is to provide a sensor for hydrocarbons which is low cost, easy to install and maintain, reliable and reuseable.

A further object of the present invention is to provide a sensor for detecting the presence for liquid hydrocarbons comprising:

a.) a first conductor surrounded by a non conductive layer, a second conductor, formed of a conductive hydrocarbon swellable elastomer;

b.) the second conductor being in close proximity to the first conductor;

c.) an abuse/abrasion resistant jacket which is permeable to hydrocarbons, surrounding the first and second conductors; and d.) a non conductive, hydrocarbon permeable outerlayer surrounding the jacket.

A further object of the present invention is to provide a sensor for hydrocarbon containing liquid comprising:

a.) a first conductor formed of an electrically conductive wire core surrounded by a non-conductive outer layer, the second conductor being in close proximity to the first conductor;

b.) a second conductor formed of an elastomeric core and a conductive outer layer formed of a hydrocarbon swellable elastomer filled with a conductive filler, the filler being present in an amount so as to conduct electrical currents in the outer layer in the absence of hydrocarbon containing liquids;

c.) an abuse/abrasion resistant jacket which is permeable to hydrocarbons surrounding the first and second conductors; and d.) a non conductive, hydrocarbon permeable outer layer surrounding and attached to the jacket.

An important object of the present invention is to provide a sensor for detecting the presence of hydrocarbons and hydrocarbon containing fluids. It is formed of a first conductor which is formed of a metal, such as foil or wire surrounded by an insulative sheath; a second conductor which consists of a hydrocarbon swellable elastomer and one or more conductive fillers; an abuse/abrasion resistant fabric surrounding and holding the two conductors in close proximity to each and a hydrocarbon permeable overcoat surrounding and interpenetrating the fabric.

Another object of the present invention is to provide a hydrocarbon containing liquid sensor comprising:

a.) a first conductor;

b.) a non conductive coating overlaying the first conductor;

c.) a hydrocarbon swellable conductive elastomer layer overlaying the non conductive coating;

d.) an abuse/abrasion resistant jacket overlaying the conductive elastomer layer; and e.) a non conductive hydrocarbon permeable outer layer overlaying the jacket.

It is an additional object of the present invention to provide a sensor for detecting the present of hydrocarbon containing liquids comprising:

a.) a first conductor;

b.) a non conductive layer overlaying the first conductor;

c.) a second conductor formed of a conductive hydrocarbon swellable elastomer overlaying and surrounding the non conductive layer;

d.) one or more sensor wires overlaying the second conductor;

e.) an abuse/abrasion resistant jacket, and f.) an outer coating layer formed of a hydrocarbon permeable material, the coating layer overlaying and penetrating the jacket layer so to bond the coating layer jacket, and one or more sensor wires to the second conductor. A further object of the present invention is to provide a system having one or more sensors; a power supplying a means for detecting the loss in conductivity, such as a resistor; and a signallying means to indicate the presence of hydrocarbons.

These and other objects of the present invention will become obvious to one skilled in the art in the following description, drawings and appended claims.

IN THE DRAWINGS

DETAILED DESCRIPTION OF THE DRAWINGS

Figure 1:
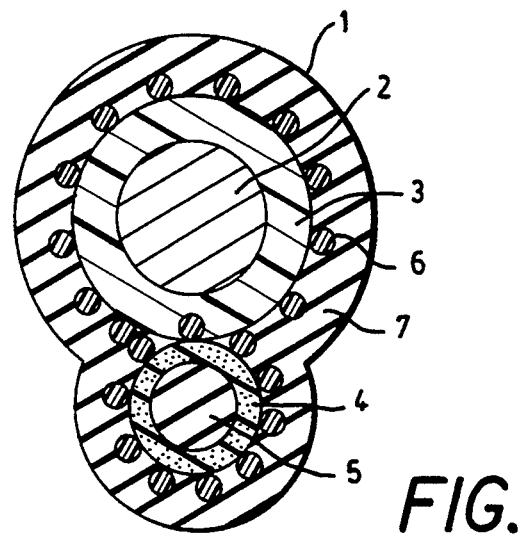
FIG. 1 shows a cross sectional view of a preferred embodiment of the present invention.

In FIG. 1 is shown a first preferred embodiment of the present invention. The sensor 1 is formed of a first conductor 2, surrounded by an insulative layer 3 and a second conductor 4 formed of a conductively filled, hydrocarbon swellable elastomer, and having a resilient non conductive core 5. The two conductors are surrounded by and kept in close proximity to each other by an abuse/abrasion resistant jacket 6 which is overcoated with a protective outer layer 7.

Figure 2:
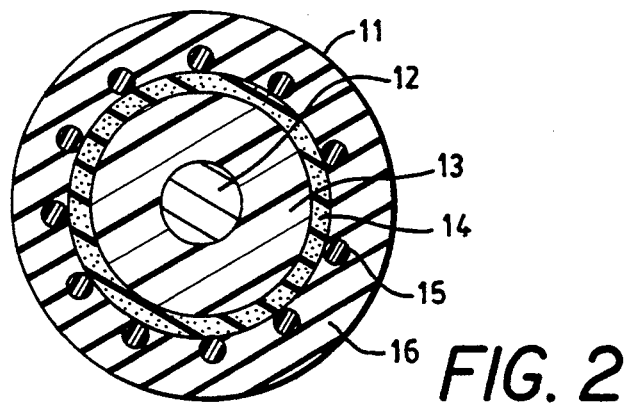
FIG. 2 shows a cross sectional view of another preferred embodiment of the present invention.

FIG. 2 shows a second preferred embodiment of the present invention where the sensor is formed as one concentric strand. The first conductor 12 is surrounded by a inner non conductive layer 13 which has the second conductor 14 formed of a conductive, hydrocarbon swellable elastomer and being located on the outer surface of the layer 13. The abuse/abrasion resistant jacket 15 is formed over the second conductor 14 and an outer protective layer 16 is formed over the jacket 15.

Figure 3:
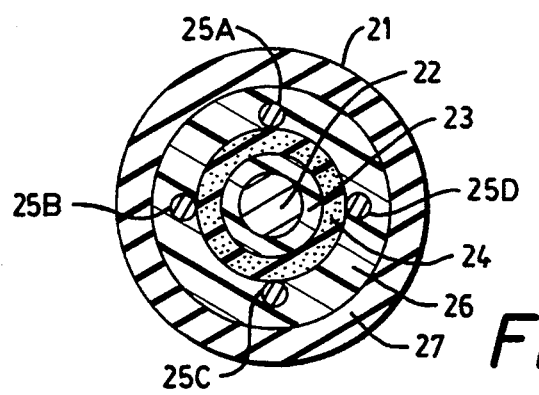
FIG. 3 shows a cross sectional view of a third preferred embodiment of the present invention.

FIG. 3 shows another variation of the present invention. The first conductor 22 forms the core of the sensor and it is surrounded by a non conductive layer 23 which is surrounded by tile second conductor 24. One or more detector wires (25-A-D) surround the second conductor. While they may contact the second conductor, it is not necessary that they do so. It is important that they be in close proximity to the conductor, so as to detect the presence or absence of an electrical current. The abuse/abrasion resistant jacket 26 is formed over the detector wires 25 (A-D) and a protective outerlayer 27 is formed over the jacket 26 and detector wires 25 (A-D) and bonded to the second conductor 24.

Figure 4:
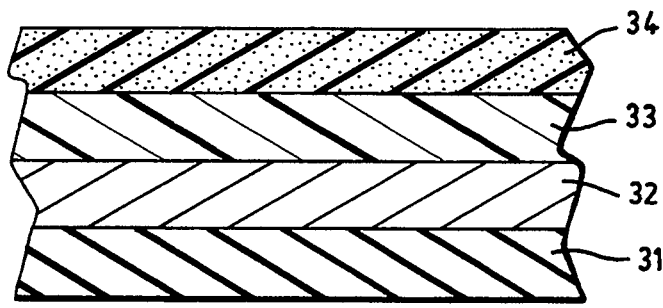
FIG. 4 shows a cross sectional view of an additional preferred embodiment of the present invention.
Figure 5:
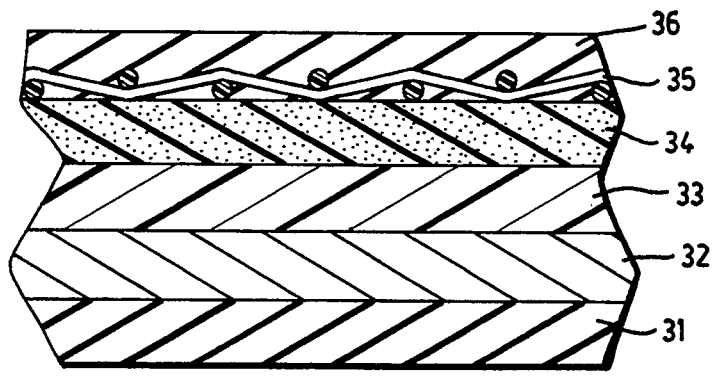
FIG. 5 shows a cross sectional view of an additional preferred embodiment of the present invention.

FIG. 4 shows a further embodiment of the present invention in tape or sheet form. The tape or sheet is formed of a nonconductive layer 31, such as MYLAR® film, a silicone rubber or a pressure sensitive adhesive, a first metal conductor layer 32, such as copper foil, aluminum foil, etc., a nonconductive layer 33 formed of plastic film or an elastomer and a conductive hydrocarbon swellable elastomer top layer 34. This embodiment is envisioned for use in a protected environment such as in between the two layers of a double walled tank or mounted to a storage tank in a basement, where abrasion is not likely to occur. If abrasion were to occur, a suitable jacket 35 and overcoat 36 as shown in FIG. 5 can be used.

The first conductor is preferably formed of a highly conductive material, such as a metal wire of foil.

Such wires are well known. They may be braided from a series of smaller wires or they may be one wire of a desired diameter. It is preferred that a multi strand copper wire (12-14 gauge) be used in the present invention. Such wire is generally available with a non conductive insulating sheath of polyethylene or polyvinyl chloride formed on its outer surface. That sheath is generally sufficient to act as the insulative layer. Alternatively, the insulative layer can be formed of a non conductive elastomer. In that instance, it is preferred that a bare wire be used as the first conductor and a separate insulative layer be formed on its outer surface.

Alternatively, the conductor is a metal foil such as copper, tin, aluminum, tinned copper, tinned aluminum, or steel. It is generally thin, flexible, and self supportive.

The second conductor is made a conductive, hydrocarbon swellable material, such that in the presence of a hydrocarbon containing liquid, it swells and becomes non conductive. Such materials are well known and generally consist of an elastomer filled with a conductive filler in an amount sufficient to provide electrical conductivity. Such elastomers include but are not limited to silicone rubbers, fluorosilicone rubbers, EPDM polymers, styrene copolymers such as styrene-butadiene copolymers, chloroprene rubber, isoprene rubber, butyl rubber, urethanes, thermoplastic rubbers, such as SANTOFRENE® polymers, and blends thereof. The fillers should be highly conductive and generally include but are not limited to noble metals, such as silver or gold; non noble metals, such as copper, iron, aluminum, cobalt nickel or tin; noble metal plated noble metals, such as silver plated gold, noble metal plated non noble metals, such as silver plated copper, nickel or aluminum; noble metal plated glass, plastic or ceramic, such as silver plated glass frit or glass microspheres; noble metal plated carbon black; carbon black or graphite or mixtures thereof.

One such conductor is available from Chomerics Inc. and is known as CHO-SEAL® 3000 elastomers. It is a hydrocarbon swellable silicone rubber matrix filled with silver plated copper or aluminum particles and formed as thin conductive coating over a non conductive core. Another such conductor is available from Chomerics, Inc. and is known as CHO-SEAL® 1215 or 1285 elastomers They are a rubber matrix, such as silicone filled with conductive particles, such as silver-plated copper or silver-plated aluminum distributed through the rubber rather than as a thin layer on a non-conductive core. They are available in various cross sectional profiles, such as round, oval, square, rectangular, "P" and "D" shape or they are available as sheet stock material, with or without a fabric reinforcing layer.

The manufacture of such filled elastomers and their use alone or over a nonconductive core are taught by U.S. Pat. Nos. 3,140,042; 4,434,541 and 4,678,716, all of which are incorporated herein by reference in their entireties.

The hydrocarbon swellable conductor should be of a thickness sufficient to ensure electrical conductivity.

Thickness will vary depending upon the current carried and the amount of filler used. Typically, the electrode will be between 1 and 7 mils in thickness.

The amount of conductive filler will depend upon the conductivity of the selected filler as well as the desired conductivity of the conductor. Typically, the filler is from about 65 to about 95% by weight of the layer, more preferably about 85% by weight. Preferred levels of conductivity should have less than 1 ohm/inch resistance, but the system will work with 100 ohm/inch resistance.

In the embodiment of FIG. 1 where the second conductor is adjacent to but not surrounding the first conductor, it is preferred to use a CHO-SEAL® 3000 gasket having a non conductive, resilient, high strength elastomer core so as to minimize elongation. The core may be formed of any of the elastomers mentioned above in regard to the second conductor and typically is formed of the same elastomer as the matrix of the second conductor to ensure good adhesion.

The abuse/abrasion resistent jacket is designed to prevent damage to the two conductors during installation and use and to allow the hydrocarbons to permeate the jacket and contact the second conductor. For example, if the sensor is used on an underground pipe, the movement of the surrounding soil due to frost, earth movement, animals or ground water could abrade either the conductive second conductor or the insulative sheath of the first conductor, thereby causing damage to the conductors and reducing the sensitivity and/or reliability of the sensor.

The jacket may be any type of fabric which is typically used in such applications. Such fabrics include but are not limited to woven or unwoven, knit or braided materials. Preferably, it is knit or braided over the conductors for the embodiments of FIGS. 1–3 so as to provide a constant continuous jacket with no seam as would occur with the use of a woven or non woven fabric attached over the conductors. For the embodiment of FIG. 5, a woven fabric is more appropriate.

The fabric of the jacket can be formed of any non conductive abuse/abrasion resistant material including, but limited to nylons, polyolefins, polyamides, other thermoplastics, glass and combinations thereof. It is preferred that the material be a high strength nylon yarn, such as Nylon 616 available from DuPont.

The outermost layer of the present invention should be of high strength and be abuse/abrasion resistant so as to minimize problems with elongation of the sensor during manufacture, installation or use and to protect the sensor from damage due to environmental or other forces. The coating must be permeable to hydrocarbons so as to allow the sensor to operate properly. Moreover, it should be formed of a material that while permeable to hydrocarbons, does not degrade in their presence. Any of the elastomers discussed above in regard to the second conductor may be used. However, it is not a requirement that the material be swellable by hydrocarbons and therefore other materials may be used as well. One preferred material is a room temperature vulcanizeable silicone rubber known as RTV 108 available from General Electric. Another is a two part silicone known as 615 A and B, available from General Electric.

The sensor of the present invention can be made in a variety of ways.

For example, in forming a sensor as shown in FIG. 1, one can take a coated wire, such as a plastic coated 14 gauge copper wire and hold it against a second conductor formed of a conductive gasket such as CHO-SEAL® 3000 gasket and run the two conductors simultaneously through a die so as to apply the abuse/abrasion resistant jacket over the two conductors in snug manner. Preferably, the jacket is formed by knitting or braiding over the two conductors so as to form a sheath. Alternatively, one can form the jacket from a separate fabric. In this embodiment one may coat either the conductors or more preferably at least a portion of the jacket, wrapping the jacket over the conductors and running the two conductors and jacket through a die or pressure nip to bond the jacket to itself or to the conductors. Alternatively, the conductors or jacket may be coated with an adhesive and the jacket may be wrapped spirally over the length of the conductors. The outer layer may be applied by a variety of means that are well known in the art. Such means include but are not limited to dipping the jacketed conductors into a bath of coating material, extruding the outer layer over the jacketed conductors or spraying the outer layer on to the jacketed assembly. Preferably, a dipping process is used.

In forming a concentric type of sensor as shown by the embodiments of FIGS. 2 and 3, one takes either a bare wire and applies a desired coating or starts with coated, insulated wire and applies the second conductor over the insulative layer. The second conductor may be applied by such means as dipping, extruding or spraying, with dipping being preferred. The jacket and outer layer are applied as discussed above in regard to the embodiment of FIG. 1.

Another method for the concentric embodiments is a simultaneous or sequential extrusion process in which each of the layers are placed upon each other in the preferred order.

To form the sensor in tape or sheet form, one can laminate a metal foil such as copper, aluminum, tinned copper, tinned aluminum, steel, etc. onto a lower non conductive layer, which may be a plastic film such as MYLAR® film, a non conductive rubber or elastomer such as those material above for use as the matrix of the second conductor, or a pressure sensitive adhesive such as an acrylic adhesive. A non conductive layer, such as a plastic film or rubber or elastomer is coated on the other side of the foil. A conductive layer is then applied, either in liquid form or as a premade conductive sheet stock such as CHO-SEAL® sheet stock and the entire assembly is bonded together by heat, pressure and/or adhesives. Optionally, an abuse/abrasion jacket and/or hydrocarbon penetrable outer layer may also be added, either on top of the second conductor or surrounding a portion or all of the lower structure.

Other methods of forming each of the layers and the finished sensors should be obvious to those skilled in the art and would be useful in this invention as well.

The completed sensor has a length greater than its diameter. A continuous sensor of several hundred feet is preferred so that only one piece of sensor is needed in a lengthy application.

Such a sensor can be wrapped around a pipe through which hydrocarbon containing liquids are conveyed. Alternatively, they may be laid below or adjacent to the pipe line or storage tank so that any hydrocarbon containing fluid that is leaked will be detected as it moves into the ground. Additionally, if desired, the sensor may partially wrap the pipeline or tank, such as on its lower half in order to detect the presence of hydrocarbon containing fluids. Moreover, a series of sensors could be set up in an overlapping grid formation. This would be particularly useful in tank farms and other well defined areas.

The sensor in the form of a sheet may be placed beneath a transformer, such as in a power station or a barrel or other vessel, as in a plane or warehouse to detect any leakage from the container above it.

Figure 6:
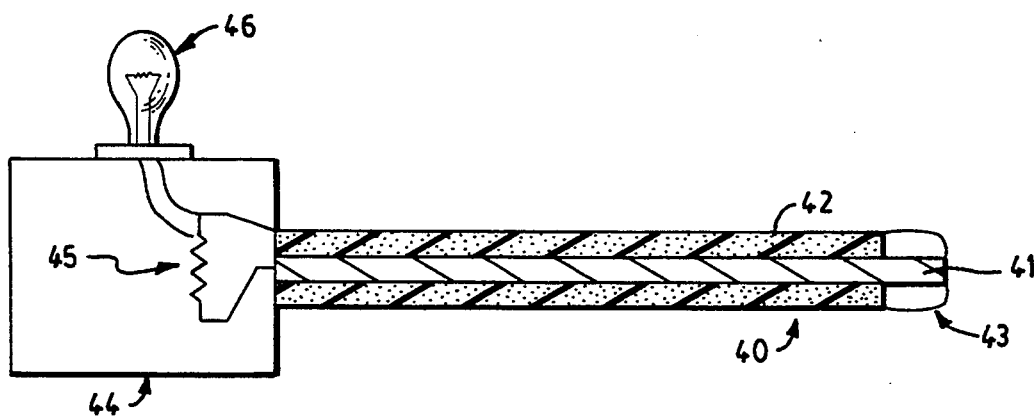
FIG. 6 shows a sensor according to the present invention in use.

FIG. 6 shows a system for using the sensor. The sensor 40 is the embodiment of FIG. 2. It has the first conductor 41 coupled at one end to the second conductor 42 by one or more electrical leads 43, such as wires, solder, wire nuts, etc. A current is supplied from the detection/alarm center 44 such as from a battery, or an AC or DC electrical source, to the second conductor 42, through the one or more leads 43 and returned to the detection/alarm center 44 via the first conductor 41 so as to form a circuit. A resistance sensor 45 is mounted between the first and second conductor and is designed to set off an alarm or indicator 46 when the resistance detected raises above a preset threshold value. That value is reached when the conductivity of the second conductor is reduced or ceased due to the presence of hydrocarbons somewhere along the length of the sensor 40. Preferably, a series of detector/alarms may be used in those instances where the sensor must cover a significant area, e.g. pipelines, large storage tanks, etc.

Alternatively, other signal/location indicators may be used in conjunction with the sensor to help locate the source of the hydrocarbon containing fluid along the length of the sensor. One such signal can be an electrical switch which upon the disruption of the signal in the sensor, causes the switch to be shut off. This is especially useful for fuel pump or ship ballast applications. The switch may be designed so that it requires manual reactivation. More preferably, such switches are designed so that only those switches adjacent the sensor portion which is affected by the hydrocarbon are triggered. Alternatively, a signal transponder system could be used such that the closest to the detected liquid can be interrogated by a transponder signal to identify the location of the hydrocarbons.

Preferably, a series of such signals are mounted at regular intervals along the length of the sensor system. The distance at which the signals are spaced apart from each other will depend on a variety of factors such as how the sensor is located (wrapped around a pipe or laying adjacent to and along the length of a pipe), how close an indication is desired, cost, etc.

The following is an example of a preferred embodiment of the present invention.

EXAMPLE 1

A length of plastic insulated solid copper wire (14 gauge) and a similar length of a conductively coated non-conductive core gasket, known as CHO-SEAL® 3000 were held adjacent to each other and a jacket of nylon having 10 openings per inch was knitted over the two conductors so that they were snugly held within the jacket. A protective outer coat of non-conductive silicone, was applied over and through the jacket.

The sensor was connected at one end to an alarm and the first and second conductors were then attached to each other at the end furthest from the alarm to form a conductive circuit. An electrical current of 9 volts was applied to the sensor. The sensor was immersed in a variety of hydrocarbon containing liquids at temperatures varying from −30° F. to 150° F. The time was recorded from immersion until the circuit was broken. After removal from the hydrocarbon liquid, the sensor was allowed to dry and again connected to the power supply and the circuit was completed. This procedure was repeated several times and each time after removal from the hydrocarbon source and removal of the hydrocarbon from the sensor such as by allowing the sensor to sit for a period of 15 to 30 minutes (depending upon the temperature of the fluid into which it was immersed) or by cleaning the sensor with a rag or heating in an oven, the sensor was capable of being reactivated and reused without any discernable evidence of decay, abuse, or loss of performance.

Various fuels including gasoline, jet fuel and kerosene, oils such as new multiweight automotive oil, used automotive oil, transmission fluid, and transformer oil were tested. In all instances, the sensor detected the presence of the hydrocarbon fluid in an average of about 30 seconds. The above example clearly shows that the sensor of the present invention is capable of fast, reliable and repetitive detection of hydrocarbon containing liquids.

While not wishing to be bound by any particular theory, it is belived that the present invention works in the following manner:

The sensor acts like an on-off switch. In the absence of hydrocarbons, both the wire and elastomeric conductive layer are eletrically conductive and when coupled to a power source form a conductive circuit. However, in the presence of hydrocarbons, the elastomeric conductive layers become non-conductive. Experimentation has shown that the elastomer swells in the presence of hydrocarbons, but not water or salts. The swelling of the elastomer interfers with the conductivity of the coating, essentially rendering it nonconductive. The break in continuity causes the system to go "off", thereby indicating the presence of hydrocarbons. Once the hydrocarbon source is removed from the sensor the sensor is again conductive.

While the present invention has been described in reference to its preferred embodiments, other equivalents, modifications, and variations can achieve the same result, and it is intended in the appended claims to include all such modifications, variations and equivalents as fall within the true spirit and scope of this invention.

What we claim:

1.) A detector for liquid hydrocarbons comprising:
 a.) a first conductor surrounded by a non conductive layer;
 b.) A second conductor formed of a hydrocarbon swellable, conductively filled elastomer, the second conductor being in close proximity to the first conductor wherein the elastomer is conductive in the absence of a hydrocarbon containing liquid and is swellable and nonconductive in the presence of a hydrocarbon containing liquid;
 c.) an abuse/abrasion resistant jacket surrounding the first and second conductors; and
 d.) a non conductive, hydrocarbon permeable outer layer surrounding the jacket.

2.) The detector of claim 1 wherein the first conductor is selected from the group consisting of formed of a metal wire and metal foil; the non conductive layer is from the group consisting of plastic and rubber; the jacket is formed of a fabric and the outer layer is formed of a silicone rubber.

3.) The detector of claim 1 wherein the first and second conductors are parallel to and in contact with each other.

4.) The detector of claim 1 wherein the first conductor is selected from the group consisting of solid core and braided wire; the second conductor is formed of an elastomer selected from the group consisting of silicones, fluorosilicones, EPDM rubbers butyl rubbers, chloroprenes, isoprene rubbers, thermoplastic rubbers styrene copolymers and blends thereof; and a conductive filler selected from the group consisting of noble metals, non-noble metals, noble metal plated non-noble metals, noble metals plated glass, noble metal plated plastic, noble metal plated carbon, carbon black, graphite and mixtures thereof.

5.) A sensor for detecting the presence of hydrocarbon containing liquid comprising:
   a.) a first conductor formed of an electrically conductive wire surrounded by a non-conductive outer layer;
   b.) a second conductor formed of an elastomeric core and a conductive outer layer formed of a hydrocarbon swellable elastomer filled with a conductive filler, the filler being present in an amount so as to conduct electrical currents in the outer layer in the absence of hydrocarbon containing liquids and to become nonconductive in the presence of hydrocarbon containing liquids;
   c.) an abuse/abrasion resistant jacket surrounding the first and second conductors; and
   d.) a non conductive, hydrocarbon permeable outer layer surrounding and attached to the jacket.

6.) A hydrocarbon containing liquid sensor comprising:
   a.) a first conductor;
   b.) a non conductive coating surrounding the first conductor;
   c.) a conductive, hydrocarbon swellable elastomer layer overlaying the non conductive coating, the elastomer being conductive in the absence of hydrocarbon containing liquids and nonconductive in the presence of hydrocarbon containing liquids;
   d.) an abuse/abrasion resistant hydrocarbon permeable jacket overlaying the conductive elastomer layer; and
   e.) a non conductive hydrocarbon permeable outer layer overlaying the jacket.

7.) The sensor of claim 6 wherein the first conductor is selected from the group consisting of metal wire and metal foil, the non conductive layer is selected from the group consisting of thermoplastics, and thermosets; the conductive elastomer is an elastomer filled with conductive particles, the jacket is a fabric selected from the group consisting of nylons, polyolefins, polyamides other thermoplastics, glass and combinations thereof, and the outer layer is selected from the group consisting of silicones, fluorosilicones, EPDM rubbers, butyl rubbers, chloroprenes, isoprene rubbers, styrene copolymers urethanes and blends thereof.

8.) The sensor of claim 6 wherein the conductive elastomer is formed of a silicone rubber and a conductive filler wherein the filler is selected from the group consisting of noble metals, non-noble metals, noble metal plated non-noble metals, noble metal plated glass, noble metal plated plastic, noble metal plated carbon, carbon black, graphite and mixtures thereof.

9.) a sensor for detecting the presence of hydrocarbon containing liquids comprising:
   a.) a first conductor;
   b.) a non conductive layer overlaying the first conductor;
   c.) a second conductor formed of a hydrocarbon swellable, conductive elastomer overlaying and surrounding the non conductive layer;
   d.) one or more sensor wires overlaying the second conductor;
   e.) an abuse/abrasion resistant jacket, and
   f.) an outer coating layer formed of a hydrocarbon permeable material, the coating layer overlaying and penetrating the jacket layer so to bond the coating layer jacket, and one or more sensor wires to the second conductor.

10. A system for detecting the presence of liquid hydrocarbons comprising:
   a.) a sensor means having a first and second end, the sensor means being formed of a first conductor, a non conductive layer overlaying the first conductor, a second conductor overlaying the non conductive layer and being formed of a hydrocarbon swellable elastomer filled with one or more conductive fillers wherein the second conductor is conductive in the absence of a hydrocarbon containing liquid and non conductive in the presence of a hydrocarbon containing liquid, an abuse/abrasion resistant jacket overlaying the first and second conductors, and a hydrocarbon permeable outerlayer overlaying the jacket;
   b.) an electrical supply means attached to the first and second conductors at the first end of the sensor means;
   c.) a means for forming electrical connections attached to the second end of the sensor means and coupling the first conductor to the second conductor so as to complete a circuit;
   d.) a means for detecting the resistance of the circuit being coupled to the first and second conductors of the sensor means; and
   e.) a means for signaling a resistance above a present value attached to the resistance detection means.

11.) The system of claim 10 wherein the electrical supply means is selected from the group consisting of a battery, AC current and DC current supplies; the electrical connecting means is selected from the group consisting of electrical leads, solder, and wire nuts; the means for detecting the resistance is a resistor and the means for signaling is selected from the group consisting of alarms, lights and switches.

12.) The system of claim 10 wherein the sensor is located adjacent a supply of liquid hydrocarbons.

13.) The system of claim 12 wherein the sensor is located below the supply of liquid hydrocarbons.

14.) The system of claim 12 wherein the supply of liquid hydrocarbons is selected from the group consisting of tanks, pipes, hoses, barrels, bilges pumps and transformers.

* * * * *